United States Patent
Chang

(10) Patent No.: US 11,752,883 B1
(45) Date of Patent: Sep. 12, 2023

(54) DYNAMOTOR MODULE WITH DC TERMINAL VOLTAGE, TRANSMISSION COMPRISING THE SAME AND VEHICLE COMPRISING THE SAME

(71) Applicant: Chun-Jong Chang, Zhubei (TW)

(72) Inventor: Chun-Jong Chang, Zhubei (TW)

( * ) Notice: Subject to any disclaimer, the term of this patent is extended or adjusted under 35 U.S.C. 154(b) by 0 days.

(21) Appl. No.: 17/700,897

(22) Filed: Mar. 22, 2022

(51) Int. Cl.
  H02P 1/54      (2006.01)
  B60L 15/20     (2006.01)
  H02P 5/68      (2006.01)
  H02P 6/04      (2016.01)
  H02K 7/00      (2006.01)

(52) U.S. Cl.
  CPC .......... *B60L 15/2036* (2013.01); *H02K 7/003* (2013.01); *H02P 5/68* (2013.01); *H02P 6/04* (2013.01); *B60L 2220/42* (2013.01); *B60L 2240/421* (2013.01); *B60L 2240/423* (2013.01)

(58) Field of Classification Search
  CPC ............. B60L 15/2036; B60L 2220/42; B60L 2240/421; B60L 2240/423; H02P 5/68; H02P 6/04; H02P 2101/45
  See application file for complete search history.

(56) References Cited

FOREIGN PATENT DOCUMENTS

| CN | 112737153 A | * | 4/2021 | ............... H02K 1/12 |
| CN | 115303054 A | * | 11/2022 | ............. B60K 17/12 |

* cited by examiner

*Primary Examiner* — Karen Masih

(57) ABSTRACT

The invention discloses a dynamotor module with DC terminal voltage, comprising a first dynamotor with DC terminal voltage and a second dynamotor with DC terminal voltage, wherein the first and the second dynamotor with DC terminal voltage are connected in parallel with a DC common terminal voltage Va, and the first dynamotor with DC terminal voltage has a first rotation speed S1 and a first effective magnetic flux density B1, the second dynamotor with DC terminal voltage has a second rotation speed S2 and a second effective magnetic flux density B2, wherein when the first dynamotor with DC terminal voltage and the second dynamotor with DC terminal voltage are operated at a steady state, the first rotation speed S1 and the second rotation speed S2 are not equal to zero, and the first effective magnetic flux density B1and the second effective magnetic flux density B2 are not equal to zero, and the absolute ratio of |S1|/|S2| is directly proportional to B2/B1.

8 Claims, 7 Drawing Sheets

DYNAMOTOR MODULE WITH DC TERMINAL VOLTAGE, TRANSMISSION COMPRISING THE SAME AND VEHICLE COMPRISING THE SAME

This application claims the benefit of U.S. provisional patent application No. 63/174,110, filed on Apr. 13, 2021, and the entirety of which is incorporated by reference herein.

BACKGROUND OF THE INVENTION

Field of the Invention

The present invention relates to a dynamotor, a transmission comprising and a vehicle comprising, and in particular relates to a dynamotor module with DC terminal voltage, a transmission comprising the dynamotor module with DC terminal voltage and a vehicle comprising the dynamotor module with DC terminal voltage.

Description of the Related Art

The gearbox of the conventional electric vehicle generally adopts a single-speed transmission. Due to the fixed transmission force, when the vehicle is climbing, it cannot provide a high torque, and when the vehicle is running on the flat ground, due to the limitation of the gear ratio, it cannot provide a higher moving speed for the vehicle. The conventional electric vehicles also have two-speed or multi-speed transmissions, which can provide two/multiple gear ratios to satisfy different needs of vehicles running at high torque or high speed. However, the two-speed or multi-speed transmission has the problem of power interruption when shifting gears, which is prone to obvious frustration and result in poor comfort. In view of this, a dynamotor module with DC terminal voltage that can improve the above-mentioned defects of the transmission and a vehicle comprising the dynamotor module with DC terminal voltage are eagerly expected by the industry.

SUMMARY OF THE INVENTION

A feature of this present invention is to provide a dynamotor module with DC terminal voltage, comprising: a first dynamotor with DC terminal voltage having a first rotation speed S1 and a first effective magnetic flux density B1; and a second dynamotor with DC terminal voltage having a second rotation speed S2 and a second effective magnetic flux density B2; wherein the first dynamotor with DC terminal voltage and the second dynamotor with DC terminal voltage are connected in parallel with a DC common terminal voltage Va, and when the first dynamotor with DC terminal voltage and the second dynamotor with DC terminal voltage are operated at a steady state, the first rotation speed S1 and the second rotation speed S2 are not equal to zero, and the first effective magnetic flux density B1and the second effective magnetic flux density B2 are not equal to zero, and the absolute ratio of |S1|/|S2| is directly proportional to B2/B1.

The above-mentioned dynamotor module with DC terminal voltage, wherein the first effective magnetic flux density B1 is provided by a first external excitation generator, and the second effective magnetic flux density B2 is provided by a second external excitation generator.

The above-mentioned dynamotor module with DC terminal voltage, wherein the first external excitation generator is a first electromagnetic inductive excitation generator, and the second external excitation generator is a second electromagnetic inductive excitation generator.

The above-mentioned dynamotor module with DC terminal voltage, wherein the first dynamotor with DC terminal voltage and the second dynamotor with DC terminal voltage are independently a DC-brush dynamotor, a brushless dynamotor module with DC terminal voltage or a commutatorless dynamotor module with DC terminal voltage.

The above-mentioned dynamotor module with DC terminal voltage, wherein the first dynamotor with DC terminal voltage is connected with a first axis to drive the first axis to rotate in a first rotation speed of S1, and the second dynamotor with DC terminal voltage is connected with a second axis to drive the second axis to rotate in a second rotation speed of S2.

Another feature of this invention is to provide a vehicle, comprising: a dynamotor module with DC terminal voltage as mentioned above; a first driving wheel coupled with the first axis of the dynamotor module with DC terminal voltage and driven by the first axis to rotate in the first rotation speed of S1; and a second driving wheel coupled with the second axis of the dynamotor module with DC terminal voltage and driven by the second axis to rotate in the second rotation speed of S2; wherein the absolute ratio of |S1|/|S2| is regulated by adjusting the inverse ratio of B2/B1.

The vehicle as mentioned above, wherein the first driving wheel and the second driving wheel are arranged bilateral symmetrically, and the turning radiuses of the first driving wheel and the second driving wheel are regulated by adjusting the absolute ratio of |S1|/|S2|.

The vehicle as mentioned above, wherein a function of Continuously Variable Transmission (CVT) is provided by simultaneously proportional increasing or decreasing B1 and B2 to adjust the Common Mode Torque of the first driving wheel and the second driving wheel.

Another feature of this invention is to provide a power transmission system, comprising: a dynamotor module with DC terminal voltage as mentioned above; a primary shaft coupled with the first axis of the dynamotor module with DC terminal voltage to drive the first axis to rotate in the speed of S1; and a loading shaft coupled with the second axis of the dynamotor module with DC terminal voltage and driven to rotate in the speed of S2 by the second axis.

DETAILED DESCRIPTION OF THE INVENTION

The making and using of the Embodiments of the present disclosure are discussed in detail below. However, it should be noted that the Embodiments provide many applicable inventive concepts that can be embodied in a variety of specific methods. The specific exemplary Embodiments discussed are merely illustrative of specific methods to make and use the Embodiments, and do not limit the scope of the disclosure.

EMBODIMENTS

Embodiment 1

Figure 1A:
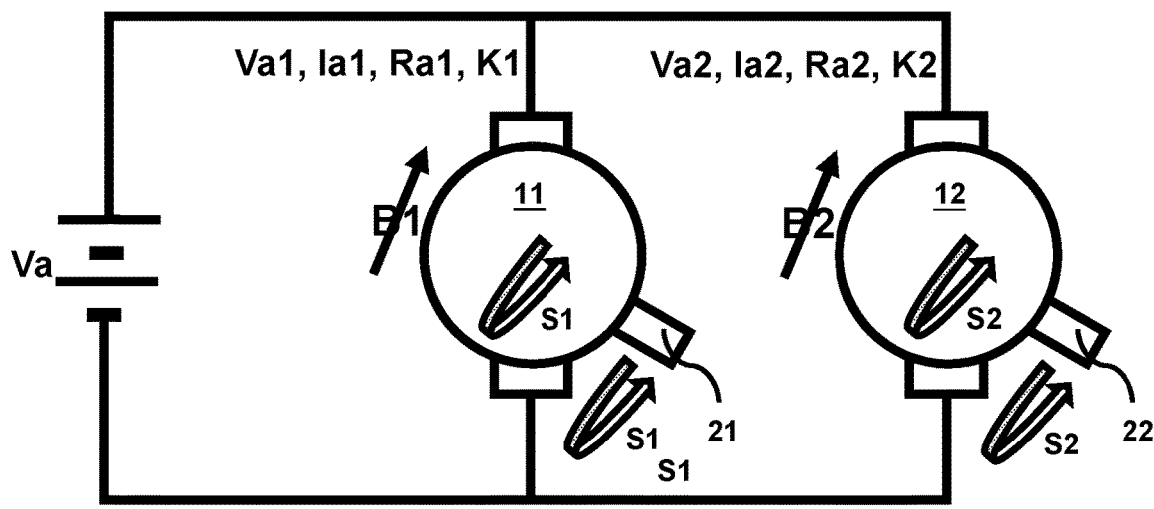
FIG. 1A is a schematic drawing illustrating a dynamotor module with DC terminal voltage 10 of the Embodiment 1 according to this present invention.

This present Embodiment 1 discloses a dynamotor module with DC terminal voltage 10 as shown in FIG. 1A, comprising: a first dynamotor with DC terminal voltage 11 having a first rotation speed S1 and a first effective magnetic flux density B1, and a second dynamotor with DC terminal voltage 12 having a second rotation speed S2 and a second effective magnetic flux density B2; wherein the first dynamotor with DC terminal voltage 11 and the second dynamotor with DC terminal voltage 12 are connected in parallel with a DC common terminal voltage Va. The first effective magnetic flux density B1 is provided by a first external excitation generator (not shown), and the second effective magnetic flux density B2 is provided by a second external excitation generator (not shown). The first dynamotor with DC terminal voltage 11 has a first armature voltage V1, a first armature current Ia1, a first armature resistance Ra1 and a first magnetomotive force constant K1, and $Va1 = Ia1 \times Ra1 + K1 \times B1 \times |S1|$. The second dynamotor with DC terminal voltage 12 has a second armature voltage V2, a second armature current Ia2, a second armature resistance Ra2 and a second magnetomotive force constant K2, and $Va2 = Ia2 \times Ra2 + K2 \times B2 \times |S2|$. Due to the first dynamotor with DC terminal voltage 11 and the second dynamotor with DC terminal voltage 12 are connected in parallel with a DC common terminal voltage Va, so $Va = Va1 = Va2$. Moreover, in motor design practice, the armature resistance will be reduced to improve the efficiency of the rotating machine, that is the first and second armature resistances Ra1 and Ra2 are both close to 0, thereby $Va1 \approx K1 \times B1 \times |S1|$ and $Va2 \approx K2 \times B2 \times |S2|$. Accordingly, $K1 \times B1 \times |S1| = K2 \times B2 \times |S2|$ since $Va1 = Va2$, and $|S1|/|S2| = K \times (B1/B2)$, wherein K is a constant equal to K1/K2. When the first dynamotor with DC terminal voltage 11 and the second first dynamotor with DC terminal voltage 12 are operated at a steady state, the first rotation speed of S1 and the second rotation speed of S2 are not equal to zero, and the first effective magnetic flux density B1 and the second effective magnetic flux density B2 are not equal to zero, and the absolute ratio of $|S1|/|S2| = K \times (B1/B2)$, therefor the absolute ratio of $|S1|/|S2|$ is directly proportional to B2/B1. Besides, the first dynamotor with DC terminal voltage 11 is connected with a first axis 21 to drive the first axis 21 to rotate in a first rotation speed of S1, and the second dynamotor with DC terminal voltage is connected with a second axis 22 to drive the second axis 22 to rotate in a second rotation speed of S2. The absolute ratio of $|S1|/|S2|$ can be regulated by adjusting the inverse ratio of B2/B1.

Figure 1B:
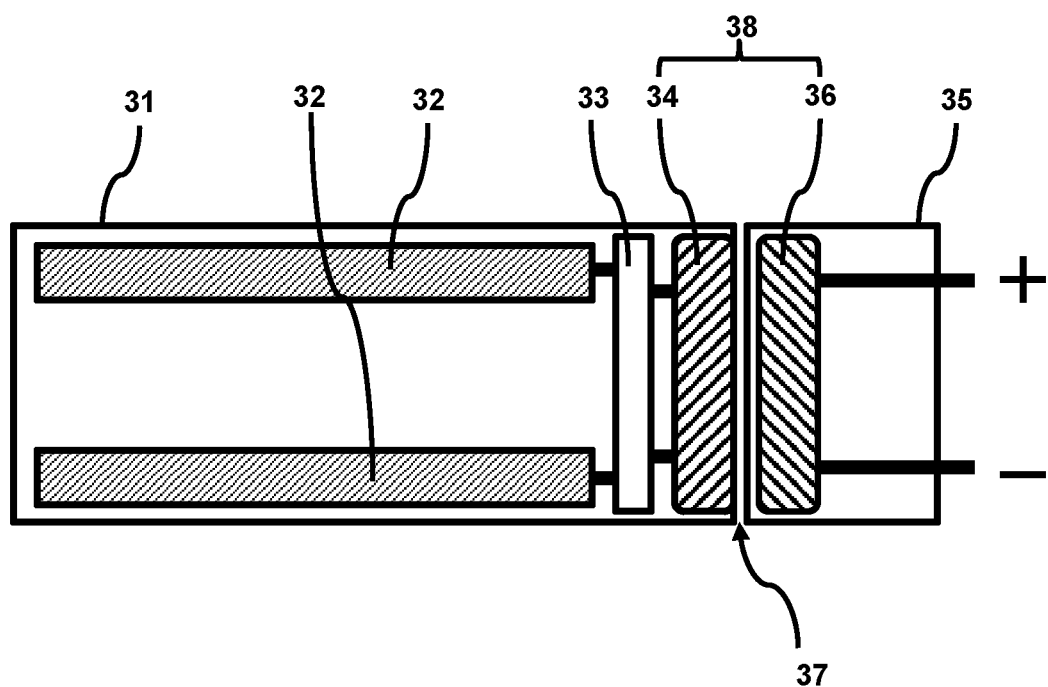
FIG. 1B is a schematic drawing illustrating the first external excitation generator 30A and the second external excitation generator 30B of the Embodiment 1 according to this present invention.

The above-mentioned first effective magnetic flux density B1 is provided by a first external excitation generator 30A as shown in FIG. 1B, and the second effective magnetic flux density B2 is provided by a second external excitation generator 30B as shown in FIG. 1B. The first external excitation generator 30A and the second external excitation generator 30B as shown in FIG. 1B can be independently for example but not limited to a first electromagnetic inductive excitation generator including a rotator 31 and a stator 35 spaced by a rotator/stator gap 37. As shown in FIG. 1B, the rotator 31 comprises a rotor magnetic field coil 32, a rotor excitation rectifier 33 and a rotor secondary electromagnetic sensor 34 electrically connected with each other; the stator 35 comprises a primary electromagnetic sensor 36 electrically connected with a time-varying current (not shown). Besides, the rotor secondary electromagnetic sensor 34 is disposed at the place where the rotor 31 adjacent to the gap 37 between the rotor 31 and the stator 35, and the stator primary electromagnetic sensor 36 is disposed at the place where the stator 35 adjacent to the gap 37 between the rotor 31 and the stator 35, and an electromagnetic induction transformer 38 for the first external excitation generator 30A and a second external excitation generator 30B can be constituted by the rotor secondary electromagnetic sensor 34 and the stator primary electromagnetic sensor 36 spaced by each other. When a time-varying current is input through the stator primary electromagnetic sensor 36 of the electromagnetic induction transformer 38, and an induced current is output through the rotor secondary electromagnetic sensor 34 of the electromagnetic induction transformer 38 and then be rectified through the rotor excitation rectifier 33 of the rotor 31 to supply a DC to the rotor magnetic field coil 32 to respectively output a first effective magnetic flux density B1 or a second effective magnetic flux density B2. The above-mentioned rotor secondary electromagnetic sensor 34 and the stator primary electromagnetic sensor 36 can respectively comprise an electromagnetic induction conductor (not shown) and/or an electromagnetic induction coil (not shown). According to other embodiments of the present invention, the above-mentioned first and second effective magnetic flux densities B1 and B2 can also be provided by a conventional non-inductive external excitation generator (not shown), and detailed description will not be described herein.

The first dynamotor with DC terminal voltage 11 and the second dynamotor with DC terminal voltage 12 of the dynamotor module with DC terminal voltage 10 of the Embodiment 1 can be independently a conventional brush motor for example but not limited to a brush-slip ring contact power supplied motor (not shown), or a conventional brushless dynamotor (not shown), or a commutatorless DC dynamotor for example but not limited to the DC dynamotors invented by the applicant and disclosed in following TW patents: TWI624149, TWM554665, TWI696333, TWM581327, TWI724841 and TWM600504.

Embodiment 2

Figure 2A:
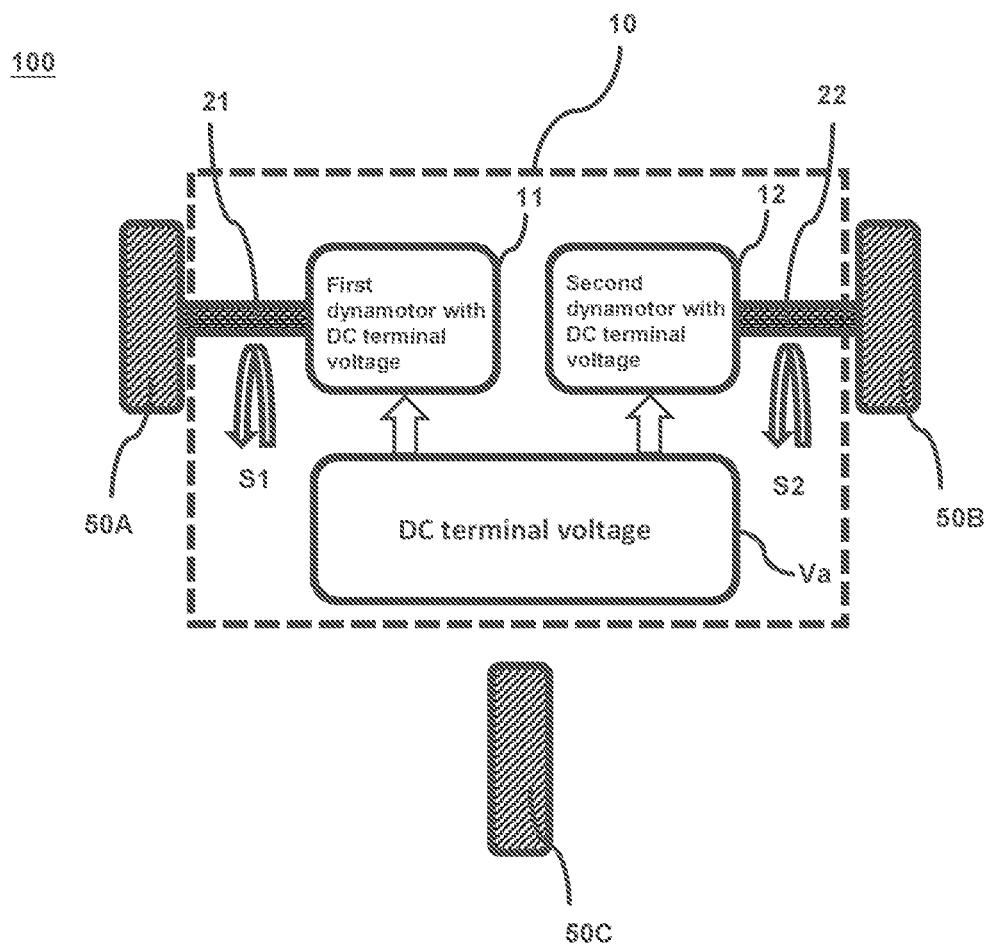
FIG. 2A is a schematic drawing illustrating a front two-wheels drive three-wheeled vehicle 100 of the Embodiment 2 according to this present invention.

FIG. 2A is a schematic drawing illustrating a front two-wheels drive three-wheeled vehicle 100 of the Embodiment 2 according to this present invention. As shown in FIG. 2A, the front two-wheels drive three-wheeled vehicle 100 comprises a dynamotor module with DC terminal voltage 10 as shown in FIG. 1A, a first front driving wheel 50A coupled with the first axis 21 of the dynamotor module with DC terminal voltage 10 and driven by the first axis 21 to rotate in the first rotation speed of S1, a second front driving wheel 50B coupled with the second axis 22 of the dynamotor module with DC terminal voltage 10 and driven by the second axis 22 to rotate in the second rotation speed of S2, and a first rear free wheel 50C or a first rear steering wheel 50C, wherein the absolute ratio of |S1|/|S2| is regulated by adjusting the inverse ratio of B2/B1 of the dynamotor module with DC terminal voltage 10. Besides, the first front driving wheel 50A and the second front driving wheel 50B of the front two-wheels drive three-wheeled vehicle 100 are arranged bilateral symmetrically, and the turning radiuses of the first front driving wheel 50A and the second front driving wheel 50B can be regulated by adjusting the absolute ratio of |S1|/|S2|.

When the first rotation speed S1 of the first front driving wheel 50A equals to the second rotation speed S2 of the second front driving wheel 50B, the front two-wheels drive three-wheeled vehicle 100 will be driven to move forward or backward. When the front two-wheels drive three-wheeled vehicle 100 is driven to move forward, and the first rotation speed S1 of the first front driving wheel 50A is greater than the second rotation speed S2 of the second front driving wheel 50B, the front two-wheels drive three-wheeled vehicle 100 will be driven to move forward and turn right. When the front two-wheels drive three-wheeled vehicle 100 is driven to move forward, and the second rotation speed S2 of the second front driving wheel 50B is greater than the first rotation speed S1 of the first front driving wheel 50A, the front two-wheels drive three-wheeled vehicle 100 will be driven to move forward and turn left. When the front two-wheels drive three-wheeled vehicle 100 is driven to move backward, and the first rotation speed S1 of the first front driving wheel 50A is greater than the second rotation speed S2 of the second front driving wheel 50B, the front two-wheels drive three-wheeled vehicle 100 will be driven to move backward and turn right. When the front two-wheels drive three-wheeled vehicle 100 is driven to move backward, and the second rotation speed S2 of the second front driving wheel 50B is greater than the first rotation speed S1 of the first front driving wheel 50A, the front two-wheels drive three-wheeled vehicle 100 will be driven to move backward and turn left.

Furthermore, a differential is not necessary for the front two-wheels drive three-wheeled vehicle 100 since the first front driving wheel 50A and the second front driving wheel 50B are respectively driven by the first dynamotor with DC terminal voltage 11 and the second first dynamotor with DC terminal voltage 12. Accordingly, a function of Continuously Variable Transmission (CVT) can be provided to the front two-wheels drive three-wheeled vehicle 100 by simultaneously proportional increasing or decreasing B1 and B2 to adjust the Common Mode Torque of the first front driving wheel 50A and the second front driving wheel 50B of the front two-wheels drive three-wheeled vehicle 100.

Embodiment 3

Figure 2B:
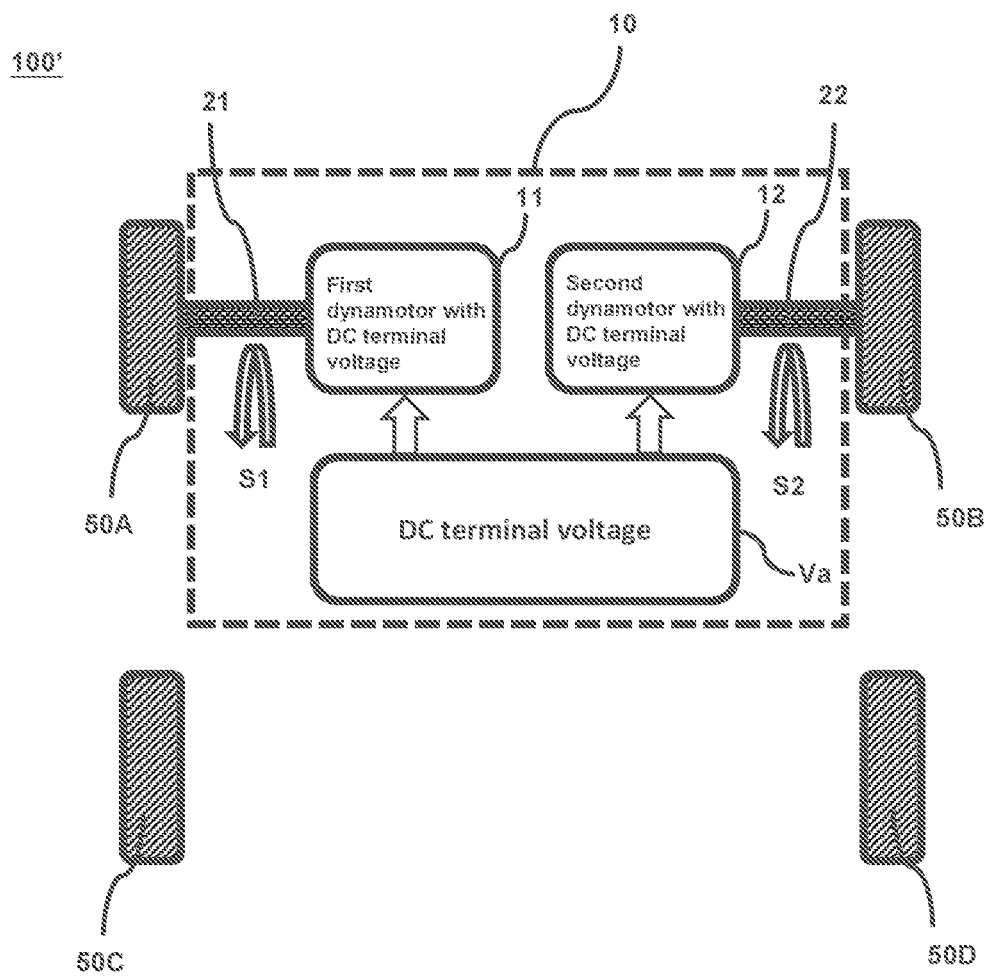
FIG. 2B is a schematic drawing illustrating a front two-wheels drive four-wheeled vehicle 100' of the Embodiment 3 according to this present invention.

FIG. 2B is a schematic drawing illustrating a front two-wheels drive four-wheeled vehicle 100' of the Embodiment 3 according to this present invention. As shown in FIG. 2B, the front two-wheels drive four-wheeled vehicle 100' comprises a dynamotor module with DC terminal voltage 10 as shown in FIG. 1A, a first front driving wheel 50A coupled with the first axis 21 of the dynamotor module with DC terminal voltage 10 and driven by the first axis 21 to rotate in the first rotation speed of S1, a second front driving wheel 50B coupled with the second axis 22 of the dynamotor module with DC terminal voltage 10 and driven by the second axis 22 to rotate in the second rotation speed of S2, a first rear free wheel 50C or a first rear steeling wheel 50C and a second rear wheel or a 50D or a second rear steering wheel 50D, wherein the absolute ratio of |S1|/|S2| is regulated by adjusting the inverse ratio of B2/B1 of the dynamotor module with DC terminal voltage 10. Besides, the first front driving wheel 50A and the second front driving wheel 50B of the front two-wheels drive four-wheeled vehicle 100' are arranged bilateral symmetrically, and the turning radiuses of the first front driving wheel 50A and the second front driving wheel 50B can be regulated by adjusting the absolute ratio of |S1|/|S2|.

When the first rotation speed S1 of the first front driving wheel 50A equals to the second rotation speed S2 of the second front driving wheel 50B, the front two-wheels drive four-wheeled vehicle 100' will be driven to move forward or backward. When the front two-wheels drive four-wheeled vehicle 100' is driven to move forward, and the first rotation speed S1 of the first front driving wheel 50A is greater than the second rotation speed S2 of the second front driving wheel 50B, the front two-wheels drive four-wheeled vehicle 100' will be driven to move forward and turn right. When the front two-wheels drive four-wheeled vehicle 100' is driven to move forward, and the second rotation speed S2 of the second front driving wheel 50B is greater than the first rotation speed S1 of the first front driving wheel 50A, the front two-wheels drive four-wheeled vehicle 100' will be driven to move forward and turn left. When the front two-wheels drive four-wheeled vehicle 100' is driven to move backward, and the first rotation speed S1 of the first front driving wheel 50A is greater than the second rotation speed S2 of the second front driving wheel 50B, the front two-wheels drive four-wheeled vehicle 100' will be driven to move backward and turn right. When the front two-wheels drive four-wheeled vehicle 100' is driven to move backward, and the second rotation speed S2 of the second front driving wheel 50B is greater than the first rotation speed S1 of the first front driving wheel 50A, the front two-wheels drive four-wheeled vehicle 100' will be driven to move backward and turn left.

Furthermore, a differential is not necessary for the front two-wheels drive four-wheeled vehicle 100' since the first front driving wheel 50A and the second front driving wheel 50B are respectively driven by the first dynamotor with DC terminal voltage 11 and the second first dynamotor with DC terminal voltage 12. Accordingly, a function of Continuously Variable Transmission (CVT) can be provided to the front two-wheels drive four-wheeled vehicle 100' by simultaneously proportional increasing or decreasing B1 and B2 to adjust the Common Mode Torque of the first front driving wheel 50A and the second front driving wheel 50B of the front two-wheels drive four-wheeled vehicle 100'.

Embodiment 4

Figure 3A:
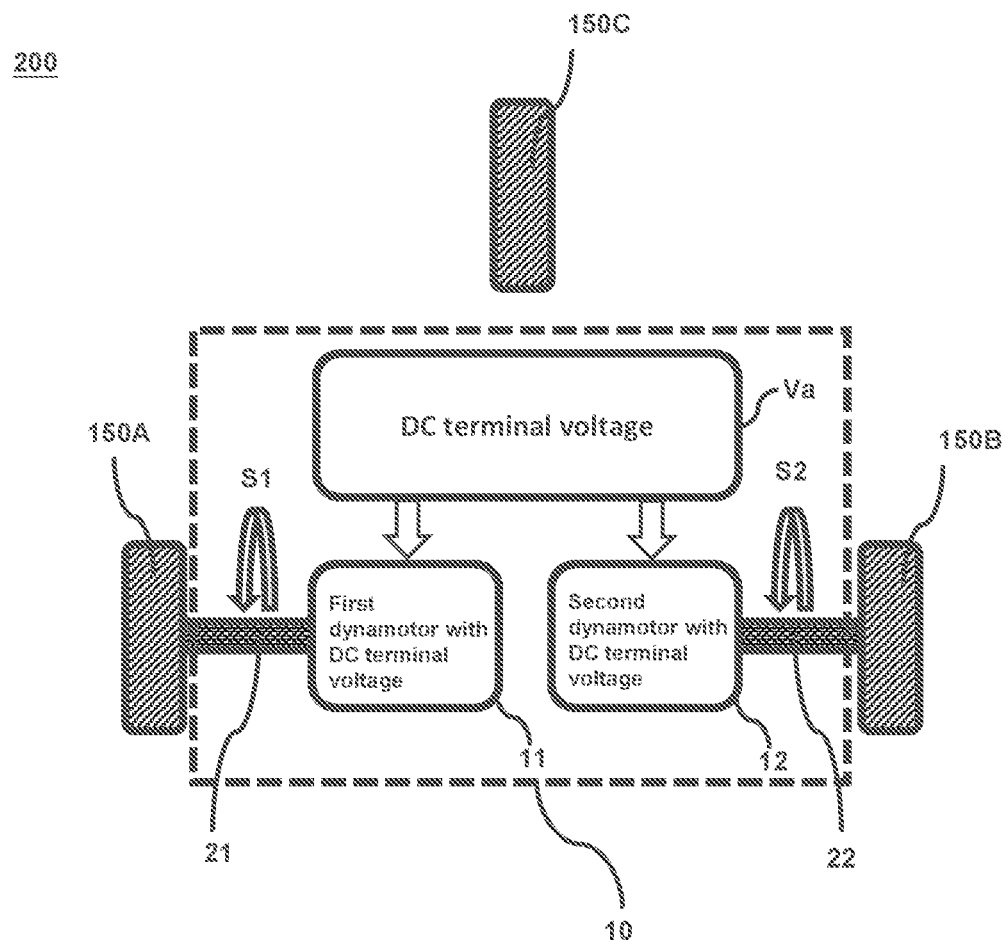
FIG. 3A is a schematic drawing illustrating a rear two-wheels drive three-wheeled vehicle 200 of the Embodiment 4 according to this present invention.

FIG. 3A is a schematic drawing illustrating a rear two-wheels drive three-wheeled vehicle 200 of the Embodiment 4 according to this present invention. As shown in FIG. 2A, the rear two-wheels drive three-wheeled vehicle 200 comprises a dynamotor module with DC terminal voltage 10 as shown in FIG. 1A, a first rear driving wheel 150A coupled with the first axis 21 of the dynamotor module with DC terminal voltage 10 and driven by the first axis 21 to rotate in the first rotation speed of S1, a second rear driving wheel 150B coupled with the second axis 22 of the dynamotor module with DC terminal voltage 10 and driven by the second axis 22 to rotate in the second rotation speed of S2, and a first front free wheel 150C or a first front steering wheel 150C, wherein the absolute ratio of |S1|/|S2| is regulated by adjusting the inverse ratio of B2/B1 of the dynamotor module with DC terminal voltage 10. Besides, the first rear driving wheel 150A and the second rear driving wheel 150B of the rear two-wheels drive three-wheeled vehicle 200 are arranged bilateral symmetrically, and the turning radiuses of the first rear driving wheel 150A and the second rear driving wheel 150B can be regulated by adjusting the absolute ratio of |S1|/|S2|.

When the first rotation speed S1 of the first rear driving wheel 150A equals to the second rotation speed S2 of the second rear driving wheel 150B, the rear two-wheels drive three-wheeled vehicle 200 will be driven to move forward or backward. When the rear two-wheels drive three-wheeled vehicle 200 is driven to move forward, and the first rotation speed S1 of the first rear driving wheel 150A is greater than the second rotation speed S2 of the second rear driving wheel 150B, the rear two-wheels drive three-wheeled vehicle 200 will be driven to move forward and turn right. When the rear two-wheels drive three-wheeled vehicle 200 is driven to move forward, and the second rotation speed S2 of the second rear driving wheel 150B is greater than the first rotation speed S1 of the first rear driving wheel 150A, the rear two-wheels drive three-wheeled vehicle 200 will be driven to move forward and turn left. When the rear two-wheels drive three-wheeled vehicle 200 is driven to move backward, and the first rotation speed S1 of the first rear driving wheel 150A is greater than the second rotation speed S2 of the second rear driving wheel 150B, the rear two-wheels drive three-wheeled vehicle 200 will be driven to move backward and turn right. When the rear two-wheels drive three-wheeled vehicle 200 is driven to move backward, and the second rotation speed S2 of the second rear driving wheel 150B is greater than the first rotation speed S1 of the first rear driving wheel 150A, the rear two-wheels drive three-wheeled vehicle 200 will be driven to move backward and turn left.

Furthermore, a differential is not necessary for the rear two-wheels drive three-wheeled vehicle 200 since the first rear driving wheel 150A and the second rear driving wheel 150B are respectively driven by the first dynamotor with DC terminal voltage 11 and the second first dynamotor with DC terminal voltage 12. Accordingly, a function of Continuously Variable Transmission (CVT) can be provided to the rear two-wheels drive three-wheeled vehicle 200 by simultaneously proportional increasing or decreasing B1 and B2 to adjust the Common Mode Torque of the first rear driving wheel 150A and the second rear driving wheel 150B of the rear two-wheels drive three-wheeled vehicle 200.

Embodiment 5

Figure 3B:
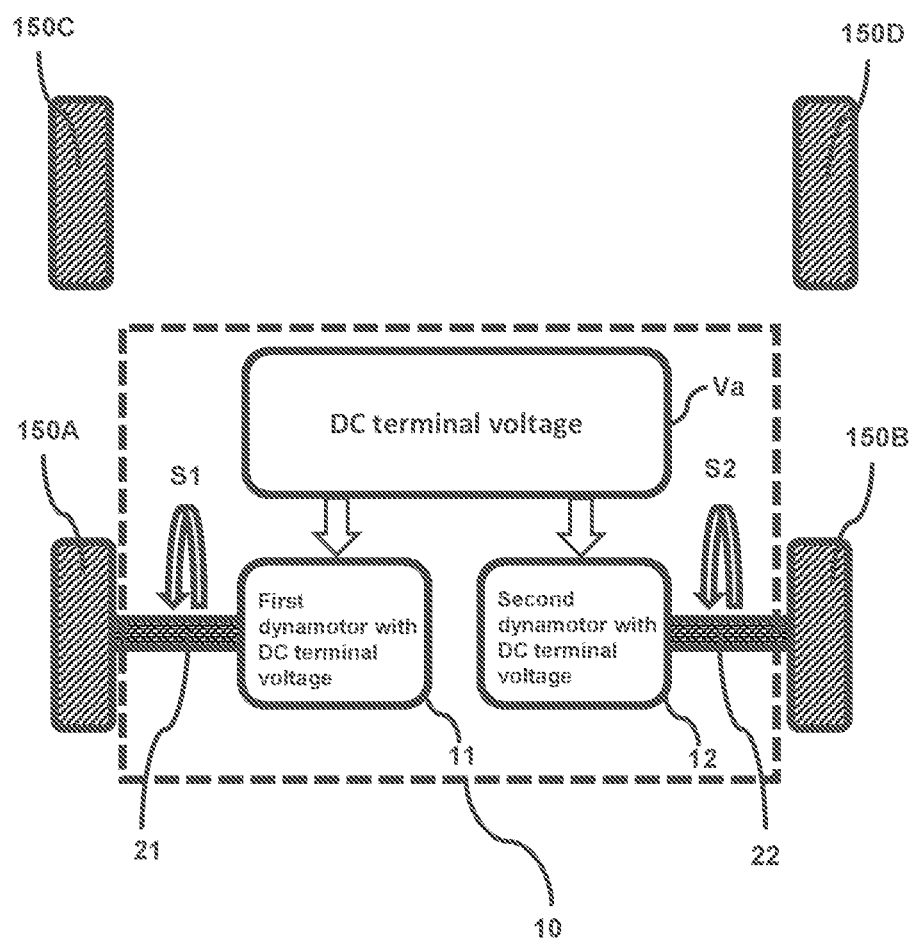
FIG. 3B is a schematic drawing illustrating a rear two-wheels drive four-wheeled vehicle 200' of the Embodiment 5 according to this present invention.

FIG. 3B is a schematic drawing illustrating a rear two-wheels drive four-wheeled vehicle 200' of the Embodiment 5 according to this present invention. As shown in FIG. 2A, the rear two-wheels drive four-wheeled vehicle 200' comprises a dynamotor module with DC terminal voltage 10 as shown in FIG. 1A, a first rear driving wheel 150A coupled with the first axis 21 of the dynamotor module with DC terminal voltage 10 and driven by the first axis 21 to rotate in the first rotation speed of S1, a second rear driving wheel 150B coupled with the second axis 22 of the dynamotor module with DC terminal voltage 10 and driven by the second axis 22 to rotate in the second rotation speed of S2, a first front free wheel 150C or a first front steering wheel 150C and a second front free wheel 150D or a second front steering wheel 150D, wherein the absolute ratio of |S1|/|S2| is regulated by adjusting the inverse ratio of B2/B1 of the dynamotor module with DC terminal voltage 10. Besides, the first rear driving wheel 150A and the second rear driving wheel 150B of the rear two-wheels drive four-wheeled vehicle 200' are arranged bilateral symmetrically, and the turning radiuses of the first rear driving wheel 150A and the second rear driving wheel 150B can be regulated by adjusting the absolute ratio of |S1|/|S2|.

When the first rotation speed S1 of the first rear driving wheel 150A equals to the second rotation speed S2 of the second rear driving wheel 150B, the rear two-wheels drive four-wheeled vehicle 200' will be driven to move forward or backward. When the rear two-wheels drive four-wheeled vehicle 200' is driven to move forward, and the first rotation speed S1 of the first rear driving wheel 150A is greater than the second rotation speed S2 of the second rear driving wheel 150B, the rear two-wheels drive four-wheeled vehicle 200' will be driven to move forward and turn right. When the rear two-wheels drive four-wheeled vehicle 200' is driven to move forward, and the second rotation speed S2 of the second rear driving wheel 150B is greater than the first rotation speed S1 of the first rear driving wheel 150A, the rear two-wheels drive four-wheeled vehicle 200' will be driven to move forward and turn left. When the rear two-wheels drive four-wheeled vehicle 200' is driven to move backward, and the first rotation speed S1 of the first rear driving wheel 150A is greater than the second rotation speed S2 of the second rear driving wheel 150B, the rear two-wheels drive four-wheeled vehicle 200' will be driven to move backward and turn right. When the rear two-wheels drive three-wheeled vehicle 200 is driven to move backward, and the second rotation speed S2 of the second rear driving wheel 150B is greater than the first rotation speed S1 of the first rear driving wheel 150A, the rear two-wheels drive four-wheeled vehicle 200' will be driven to move backward and turn left.

Furthermore, a differential is not necessary for the rear two-wheels drive four-wheeled vehicle 200' since the first rear driving wheel 150A and the second rear driving wheel 150B are respectively driven by the first dynamotor with DC terminal voltage 11 and the second first dynamotor with DC terminal voltage 12. Accordingly, a function of Continuously Variable Transmission (CVT) can be provided to the rear two-wheels drive four-wheeled vehicle 200' by simultaneously proportional increasing or decreasing B1 and B2 to adjust the Common Mode Torque of the first rear driving wheel 150A and the second rear driving wheel 150B of the rear two-wheels drive four-wheeled vehicle 200'.

Embodiment 6

Figure 4:
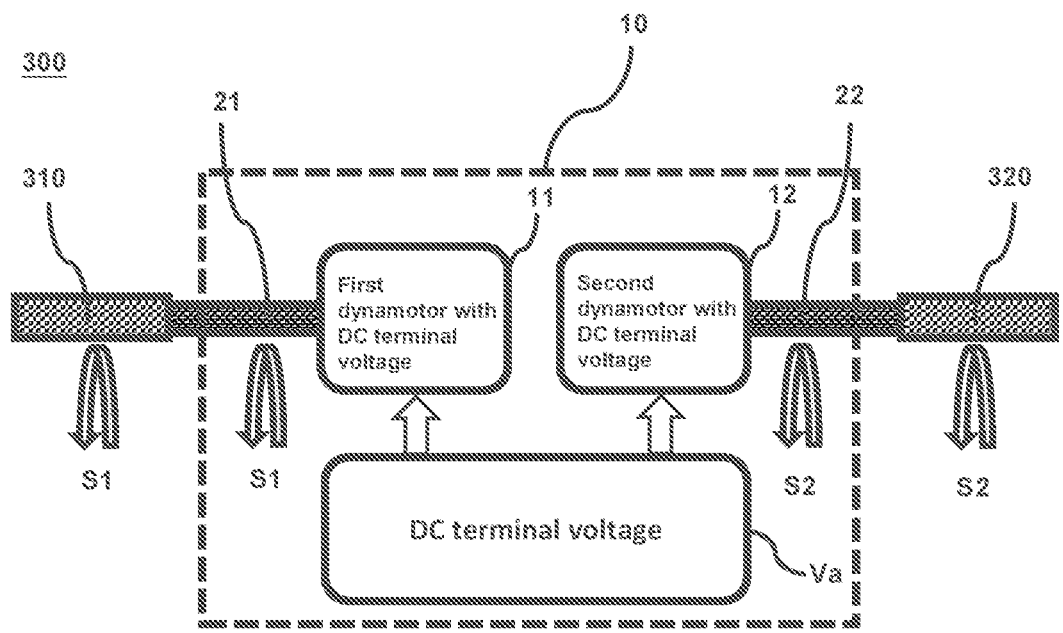
FIG. 4 is a schematic drawing illustrating a power transmission system 300 of the Embodiment 6 according to this present invention.

FIG. 4 is a schematic drawing illustrating a power transmission system 300 of the Embodiment 6 according to this present invention. As shown in FIG. 4, the power transmission system 300 comprises a dynamotor module with DC terminal voltage 10 as described in Embodiment 1, a primary shaft 310 coupled with the first axis 21 of the dynamotor module with DC terminal voltage 10 to drive the first axis 21 to rotate in the speed of S1, and a loading shaft 320 coupled with the second axis 22 of the dynamotor module with DC terminal voltage 10 and driven to rotate in the speed of S2 by the second axis 22. As described in Embodiment 1, the absolute ratio of |S1|/|S2| can be regulated by adjusting the inverse ratio of B2/B1.

The invention has been described by way of example and in terms of the preferred Embodiments, it is to be understood that the invention is not limited to the disclosed Embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dynamotor module with DC terminal voltage, comprising:
   a first dynamotor with DC terminal voltage having a first rotation speed S1 and a first effective magnetic flux density B1, wherein the first dynamotor with DC terminal voltage is connected with a first axis to drive the first axis to rotate in a first rotation speed of S1; and
   a second dynamotor with DC terminal voltage having a second rotation speed S2 and a second effective magnetic flux density B2, wherein the second dynamotor with DC terminal voltage is connected with a second axis to drive the second axis to rotate in a second rotation speed of S2, wherein the first axis and the second axis are independent, not co-axial and not coupled with each other;
   wherein the first dynamotor with DC terminal voltage and the second dynamotor with DC terminal voltage are connected in parallel with a DC common terminal voltage Va, and when the first dynamotor with DC terminal voltage and the second dynamotor with DC terminal voltage are operated at a steady state, an absolute value of the first rotation speed |S1| and an absolute value of the second rotation speed |S2| are greater than zero, and the first effective magnetic flux density B1 and the second effective magnetic flux density B2 are greater than zero, and a ratio of |S1|/|S2| is directly proportional to B2/B1.

2. The dynamotor module with DC terminal voltage as claimed in claim 1, wherein the first effective magnetic flux density B1 is provided by a first external excitation generator, and the second effective magnetic flux density B2 is provided by a second external excitation generator.

3. The dynamotor module with DC terminal voltage as claimed in claim 2, wherein the first external excitation generator is a first electromagnetic inductive excitation generator, and the second external excitation generator is a second electromagnetic inductive excitation generator.

4. The dynamotor module with DC terminal voltage as claimed in claim 1, wherein the first dynamotor with DC terminal voltage and the second dynamotor with DC terminal voltage are independently a DC-brush dynamotor, a brushless dynamotor module with DC terminal voltage or a commutatorless dynamotor module with DC terminal voltage.

5. A power transmission system, comprising:
   a dynamotor module with DC terminal voltage as claimed in claim 1;
   a primary shaft coupled with the first axis of the dynamotor module with DC terminal voltage to drive the first axis to rotate in the speed of S1; and
   a loading shaft coupled with the second axis of the dynamotor module with DC terminal voltage and driven to rotate in the speed of S2 by the second axis.

6. A vehicle, comprising:
   a dynamotor module with DC terminal voltage as claimed in claim 1;
   a first driving wheel coupled with the first axis of the dynamotor module with DC terminal voltage and driven by the first axis to rotate in the first rotation speed of S1; and
   a second driving wheel coupled with the second axis of the dynamotor module with DC terminal voltage and driven by the second axis to rotate in the second rotation speed of S2;
   wherein the absolute ratio of |S1|/|S2| is regulated by adjusting the inverse ratio of B2/B1.

7. The vehicle as claimed in claim 6, wherein the first driving wheel and the second driving wheel are arranged bilateral symmetrically, and the turning radiuses of the first driving wheel and the second driving wheel are regulated by adjusting the absolute ratio of |S1|/|S2|.

8. The vehicle as claimed in claim 6, wherein a function of Continuously Variable Transmission (CVT) is provided by simultaneously proportional increasing or decreasing B1 and B2 to adjust the Common Mode Torque of the first driving wheel and the second driving wheel.

* * * * *